US012803920B2

(12) United States Patent
Zhu et al.

(10) Patent No.: US 12,803,920 B2
(45) Date of Patent: Nov. 17, 2026

(54) METHOD FOR NOTIFYING ENHANCED FRAME PREEMPTION CAPABILITY INFORMATION, AND METHOD FOR CONFIGURING FRAME PREEMPTION FUNCTION

(71) Applicant: ZTE CORPORATION, Shenzhen (CN)

(72) Inventors: Xiangyang Zhu, Shenzhen (CN); Jinghai Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 306 days.

(21) Appl. No.: 18/698,540

(22) PCT Filed: Aug. 12, 2022

(86) PCT No.: PCT/CN2022/112229

§ 371 (c)(1),
(2) Date: Apr. 4, 2024

(87) PCT Pub. No.: WO2023/065791

PCT Pub. Date: Apr. 27, 2023

(65) Prior Publication Data

US 2025/0007850 A1 Jan. 2, 2025

(30) Foreign Application Priority Data

Oct. 18, 2021 (CN) ......................... 202111210521.6

(51) Int. Cl.
*H04L 47/24* (2022.01)
*H04W 8/00* (2009.01)
*H04W 8/22* (2009.01)

(52) U.S. Cl.
CPC ........... *H04L 47/245* (2013.01); *H04W 8/005* (2013.01); *H04W 8/22* (2013.01)

(58) Field of Classification Search
CPC ....... H04L 47/245; H04L 45/26; H04L 47/24; H04W 8/005; H04W 8/22; H04W 8/24; Y02D 30/00
See application file for complete search history.

(56) References Cited

U.S. PATENT DOCUMENTS 9,313,140 B2 * 4/2016 Matthews ............... H04L 47/28
2012/0082034 A1 * 4/2012 Vasseur ................... H04L 45/04
370/252

(Continued)

FOREIGN PATENT DOCUMENTS

CN 111835656 A 10/2020
CN 112637251 A * 4/2021 ............. H04L 69/06

(Continued)

OTHER PUBLICATIONS

Ruan et al. CN112637251A filed Apr. 9, 2021 (Year: 2021).*

(Continued)

*Primary Examiner* — Wutchung Chu
(74) *Attorney, Agent, or Firm* — Vivacqua Crane, PLLC

(57) ABSTRACT

Disclosed are a method for advertising enhanced frame preemption capability information and a method for configuring a frame preemption function. The method for advertising enhanced frame preemption capability information may include: acquiring enhanced frame preemption capability information, the enhanced frame preemption capability information includes at least one of: a reason for frame preemption being not enabled; an indication value for specifying a minimum value of a last fragment of a preempted packet; or a multi-level frame preemption capability supported by a port; a number of selectable values supported by the indication value is greater than a preset threshold; and sending the enhanced frame preemption capability information to a communication peer end.

14 Claims, 5 Drawing Sheets

(56) References Cited

U.S. PATENT DOCUMENTS

| | | | | |
|---|---|---|---|---|
| 2015/0117177 | A1 | 4/2015 | Ganga et al. | |
| 2020/0136953 | A1* | 4/2020 | Datta | H04L 47/245 |
| 2020/0236578 | A1* | 7/2020 | Cakulev | H04L 47/245 |
| 2023/0100069 | A1* | 3/2023 | Jager | H04W 48/16 370/329 |
| 2024/0236012 | A1* | 7/2024 | Mangin | H04L 47/564 |

FOREIGN PATENT DOCUMENTS

| | | | | | |
|---|---|---|---|---|---|
| EP | 2692099 | B1 | * | 7/2018 | H04L 45/50 |
| EP | 4099649 | A1 | * | 12/2022 | H04L 47/6295 |
| EP | 4106283 | A1 | * | 12/2022 | H04W 76/12 |

OTHER PUBLICATIONS

Institute of Electrical and Electronics Engineers. "Standard for Ethernet, Amendment 5: Specification and Management Parameters for Interspersing Express Traffic," IEEE Std 802.br™-2016, 2016, pp. 1-58.

International Searching Authority. International Search Report and Written Opinion for PCT Application No. PCT/CN2022/112229 and English translation, mailed Oct. 27, 2022, pp. 1-10.

Ojewale, M., et al. "Multi-Level Preemption in TSN: Feasibility and Requirements Analysis," IEEE 23rd International Symposium on Real-Time Distributed Computing (ISORC), 2020, pp. 47-55.

* cited by examiner

| Bit | Function | Value/meaning |
|---|---|---|
| 0 | preemption capability support | 1-supported<br>0-not supported |
| 1 | preemption capability status | 1-enabled<br>0-not enabled |
| 2 | preemption capability active | 1-active<br>0-not active |
| 4:3 | additional fragment size | 00-64 Octets<br>01-128 Octets<br>10-192 Octets<br>11-256 Octets |
| 15:5 | reserved | — |

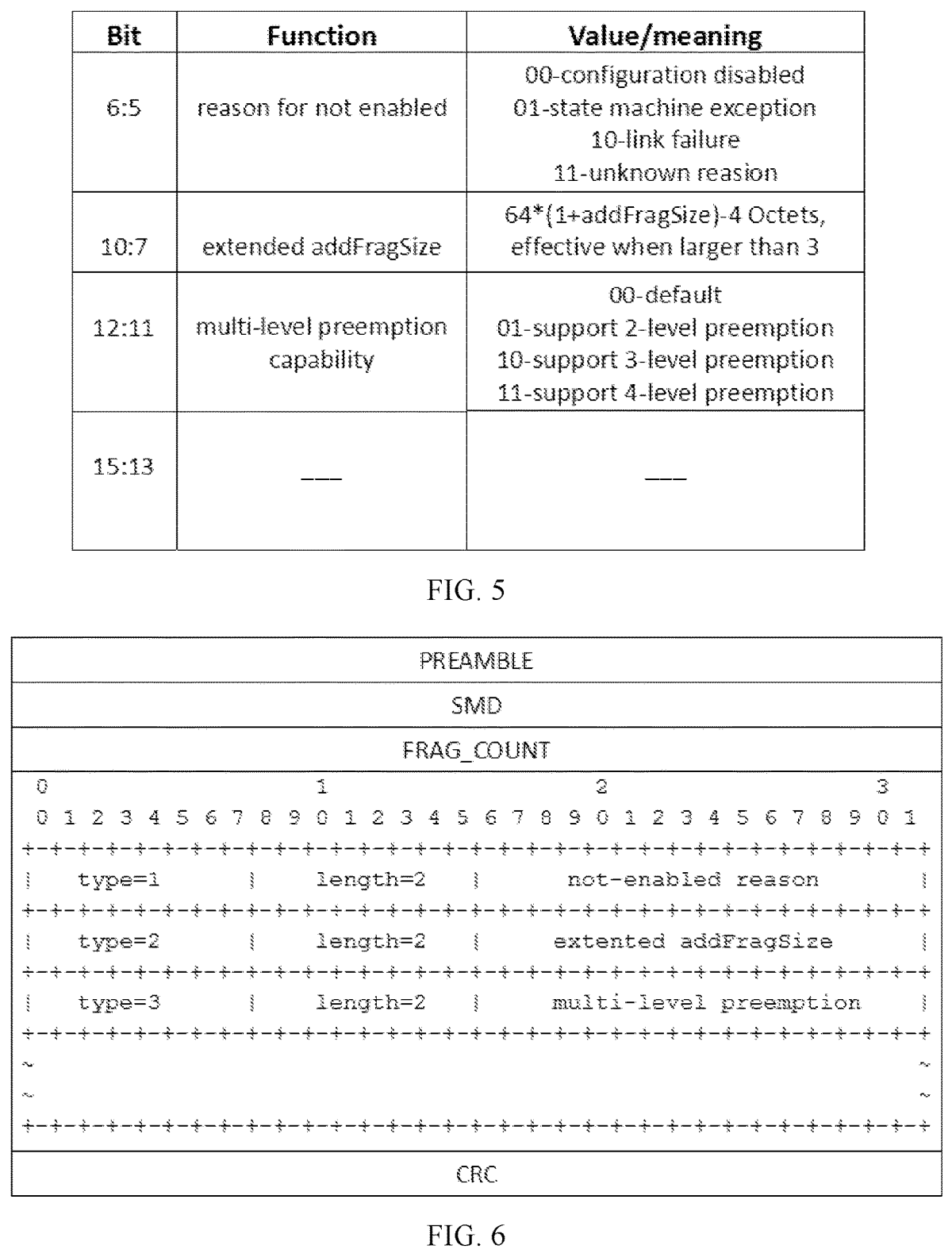

| Bit | Function | Value/meaning |
|---|---|---|
| 6:5 | reason for not enabled | 00-configuration disabled<br>01-state machine exception<br>10-link failure<br>11-unknown reasion |
| 10:7 | extended addFragSize | 64*(1+addFragSize)-4 Octets, effective when larger than 3 |
| 12:11 | multi-level preemption capability | 00-default<br>01-support 2-level preemption<br>10-support 3-level preemption<br>11-support 4-level preemption |
| 15:13 | ___ | ___ |

FIG. 5

```
PREAMBLE
SMD
FRAG_COUNT
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   type=1      |   length=2    |     not-enabled reason        |
+-+-+-+-+-+-+-+-+-+-+-+-+-+-+-+-+-+-+-+-+-+-+-+-+-+-+-+-+-+-+-+-+
|   type=2      |   length=2    |    extented addFragSize       |
+-+-+-+-+-+-+-+-+-+-+-+-+-+-+-+-+-+-+-+-+-+-+-+-+-+-+-+-+-+-+-+-+
|   type=3      |   length=2    |    multi-level preemption     |
+-+-+-+-+-+-+-+-+-+-+-+-+-+-+-+-+-+-+-+-+-+-+-+-+-+-+-+-+-+-+-+-+
~                                                               ~
~                                                               ~
+-+-+-+-+-+-+-+-+-+-+-+-+-+-+-+-+-+-+-+-+-+-+-+-+-+-+-+-+-+-+-+-+
CRC
```

FIG. 6

METHOD FOR NOTIFYING ENHANCED FRAME PREEMPTION CAPABILITY INFORMATION, AND METHOD FOR CONFIGURING FRAME PREEMPTION FUNCTION

CROSS-REFERENCE TO RELATED APPLICATION

This application is a national stage filing under 35 U.S.C. § 371 of international application number PCT/CN2022/112229, filed Aug. 12, 2022, which claims priority to Chinese patent application No. 202111210521.6, filed Oct. 18, 2021. The contents of these applications are incorporated herein by reference in their entirety.

TECHNICAL FIELD

The present disclosure relates to the field of communication, and more particularly, to a method for advertising enhanced frame preemption capability information and a method for configuring a frame preemption function.

BACKGROUND

The IEEE 802.3br standard introduces a frame preemption mechanism that associates a Media Access Control (MAC) pair (including eMAC and pMAC) with the same physical layer by adding a new MAC Merge Sublayer (MMS). If the MMS receives an eMAC packet sending request when scheduling pMAC to send low-priority traffic, the MMS stops transmitting the pMAC packet and schedules the sending of an eMAC packet. After completing the transmission of the eMAC packet, the MMS continues to transmit the pMAC packet. As such, a packet transmission opportunity preemption function is achieved.

In scenarios where a frame preemption module has been implemented at a local port and is already configured to be enabled, the enabling and configuration of the frame preemption function also depends on the frame preemption capability support status of an Ethernet port at the peer end of the link, such as whether the peer end supports frame preemption, whether the frame preemption function is enabled, etc.

However, current standards provide limited frame preemption capability information advertised, which does not guarantee the reasonable configuration of the frame preemption function.

SUMMARY

The present disclosure provides to a method for advertising enhanced frame preemption capability information and a method for configuring a frame preemption function.

To address the above problems, an embodiment of the present disclosure provides a method for advertising enhanced frame preemption capability information, including: acquiring enhanced frame preemption capability information, where the enhanced frame preemption capability information includes at least one of: a reason for frame preemption being not enabled; an indication value for specifying a minimum value of a last fragment of a preempted packet; or a multi-level frame preemption capability supported by a port; and a number of selectable values supported by the indication value is greater than a preset threshold; and sending the enhanced frame preemption capability information to a communication peer end.

An embodiment of the present disclosure provides a method for configuring a frame preemption function, including: receiving enhanced frame preemption capability information sent by a communication peer end, where the enhanced frame preemption capability information includes at least one of: a reason for frame preemption being not enabled; an indication value for specifying a minimum value of a last fragment of a preempted packet; or a multi-level frame preemption capability supported by a port; and a number of selectable values supported by the indication value is greater than a preset threshold; and determining a configuration parameter of the frame preemption function according to the enhanced frame preemption capability information sent by the communication peer end and enhanced frame preemption capability information supported locally.

An embodiment of the present disclosure provides an apparatus for advertising enhanced frame preemption capability information, including: an acquisition module configured for acquiring enhanced frame preemption capability information, where the enhanced frame preemption capability information includes at least one of: a reason for frame preemption being not enabled; an indication value for specifying a minimum value of a last fragment of a preempted packet; or a multi-level frame preemption capability supported by a port; and a number of selectable values supported by the indication value is greater than a preset threshold; and a sending module configured for sending the enhanced frame preemption capability information to a communication peer end.

An embodiment of the present disclosure provides an apparatus for configuring a frame preemption function, including: a receiving module configured for receiving enhanced frame preemption capability information sent by a communication peer end, where the enhanced frame preemption capability information includes at least one of: a reason for frame preemption being not enabled; an indication value for specifying a minimum value of a last fragment of a preempted packet; or a multi-level frame preemption capability supported by a port; and a number of selectable values supported by the indication value is greater than a preset threshold; and a determination module configured for determining a configuration parameter of the frame preemption function according to the enhanced frame preemption capability information sent by the communication peer end and enhanced frame preemption capability information supported locally.

An embodiment of the present disclosure further provides a communication device, including: at least one processor; and a memory communicatively connected to the at least one processor, where the memory stores an instruction executable by the at least one processor which, when executed by the at least one processor, causes the at least one processor to carry out the method for advertising enhanced frame preemption capability information or the method for configuring a frame preemption function.

An embodiment of the present disclosure further provides a computer-readable storage medium, storing a computer program which, when executed by a processor, causes the processor to carry out the method for advertising enhanced frame preemption capability information or the method for configuring a frame preemption function.

BRIEF DESCRIPTION OF DRAWINGS

One or more embodiments are illustrated by the diagrams in the corresponding drawings and these illustrative descriptions are not intended to constitute a limitation to the embodiments. Same or like elements are denoted by the same reference numerals in the drawings. The drawings are not drawn to scale, unless otherwise particularly stated.

FIG. 5 shows an encoding mode of a data field of an extended LLDP AEC packet according to an embodiment of the present disclosure;

FIG. 6 is a diagram showing an encapsulation format of a DATA field carrying enhanced frame preemption capability information TLV according to an embodiment of the present disclosure;

DETAILED DESCRIPTION

Objectives, technical schemes and advantages of the embodiments of the present disclosure will be clear from a detailed description of the embodiments of the present disclosure in conjunction with the drawings. However, it may be understood by those having ordinary skills in the art that although various embodiments of the present disclosure provide many technical details to make readers better understand the present disclosure. The technical schemes claimed in the present disclosure can be realized even without these technical details and various variations and modifications made based on the following embodiments.

Figures 1, 2:
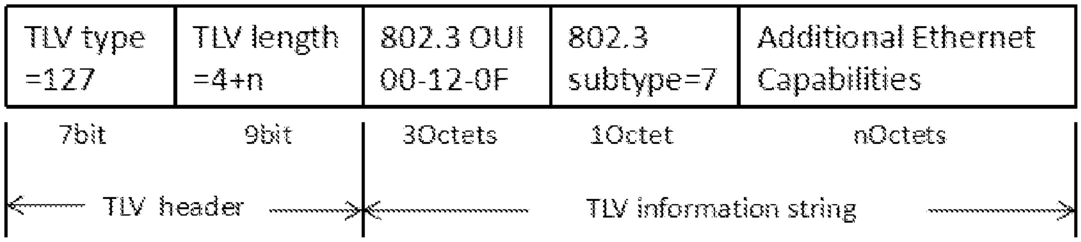
FIG. 1 is a schematic diagram of Tag-Length-Value (TLV) of a Link Layer Discovery Protocol (LLDP) Additional Ethernet Capabilities (AEC) field in related technologies.
FIG. 2 shows a definition of an AEC field supporting frame preemption basic information advertisement in related technologies.

In a commonly used method for advertising frame preemption capability information, as shown in FIG. 1, according to the IEEE 802.3br standard, an extended LLDP AEC TLV (Tag-Length-Value, where Tag is a unique identifier of this field, Length represents the Length of the Value data field, and Value represents data) field is used to advertise a frame preemption function support status of a local port to a peer end in a link. A definition of an AEC field supporting frame preemption basic information advertisement is shown in FIG. 2, where bit 0 indicates whether a frame preemption module is implemented, bit 1 indicates whether the frame preemption module is enabled, bit 2 indicates whether the frame preemption module is in an active state, bits 3-4 represent an addFragSize parameter for specifying the size of the last fragment, and bits 5-15 represent a reserved field that has not been used yet.

Figure 3:
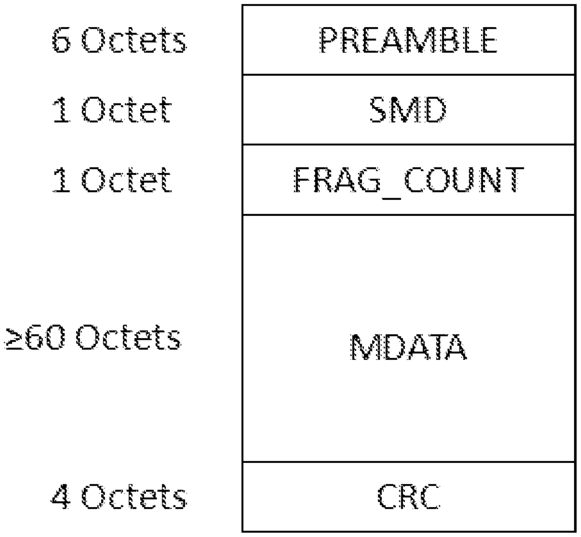
FIG. 3 is a schematic diagram of a packet format of a Media Access Control (MAC) Merge Packet (mPacket) in related technologies.

In addition, the local port may further determine a frame preemption capability of a port at the peer end through a Verify process using an mPacket as the packet format. The packet format of the mPacket is shown in FIG. 3. The local port sends a Verify (SMD_V) packet to the peer end. If the peer end supports frame preemption and frame preemption is enabled at the peer end, the peer end returns a Respond (SMD_R) packet. When receiving the SMD_R packet, the local port determines that the peer end supports frame preemption and frame preemption is enabled at the peer end. If the peer end cannot return the SMD_R packet because the frame preemption module is not enabled at the peer end, the local end sets a timeout timer, and when the timeout timer exceeds 10 ms, determines by default that the peer end does not support or has not enabled the frame preemption function.

An embodiment of the present disclosure relates to a method for advertising enhanced frame preemption capability information, including: acquiring enhanced frame preemption capability information, where the enhanced frame preemption capability information includes one or any combination of: a reason for frame preemption being not enabled, an indication value for specifying a minimum value of a last fragment of a preempted packet, or a multi-level frame preemption capability supported by a port; and a number of selectable values supported by the indication value is greater than a preset threshold; and sending the enhanced frame preemption capability information to a communication peer end. In this embodiment, when frame preemption is not enabled at the local port, the local port can advertise this information and provide a detailed reason to the port of the peer end. In addition, more addFragSize options are supported, and the advertisement of a multi-level frame preemption capability is additionally supported.

Figure 4:
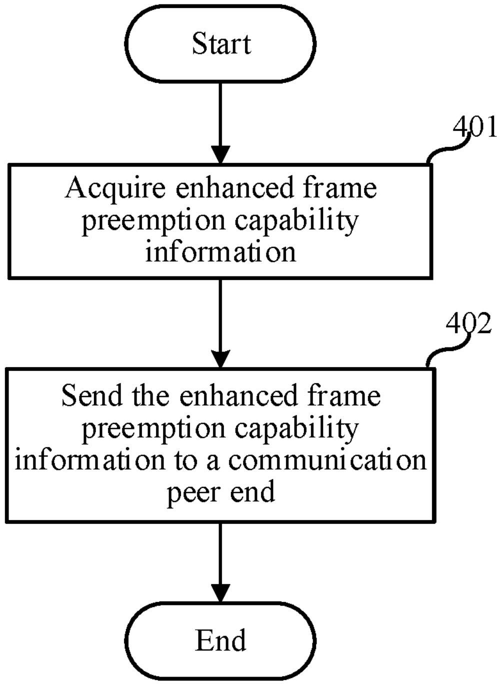
FIG. 4 is a flowchart of a method for advertising enhanced frame preemption capability information according to an embodiment of the present disclosure.

Implementation details of the method for advertising enhanced frame preemption capability information in this embodiment will be described below and the following contents are provided only for convenience of understanding the implementation details of the present scheme and are not necessary for implementing the present scheme. As shown in FIG. 4, a detailed process of the method may include the following steps 401 and 402.

At step 401, enhanced frame preemption capability information is acquired. The enhanced frame preemption capability information includes one or any combination of: a reason for frame preemption being not enabled, an indication value for specifying a minimum value of a last fragment of a preempted packet, or a multi-level frame preemption capability supported by a port. A number of selectable values supported by the indication value is greater than a preset threshold. The preset threshold can be any value greater than 4.

In an implementation, after initialization of the frame preemption module of the local port is completed, the local port acquires frame preemption information supported by the local port. The frame preemption information supported by the local port includes not only several types of basic frame preemption information defined in the IEEE 802.3br standard, but also enhanced frame preemption capability information.

The reason for frame preemption being not enabled includes: management configuration being disabled, state machine exception, unsuccessful state machine initialization, and an unknown reason.

It should be noted that, the reason for frame preemption being not enabled is added to the enhanced frame preemption capability information, such that when the local port advertises the frame preemption information to the port at the peer end in the case of frame preemption being not enabled, the impact on the frame preemption action of the peer end due to the lack of a detailed reason for frame preemption being not enabled can be eliminated.

In view of cases where the maximum length of an Ethernet jumbo frame can reach 9600 bytes, the addFragSize value is extended in the embodiments of the present disclosure, i.e., an indication value for specifying the minimum value of the last fragment of the preempted packet is extended (for convenience of description, the addFragSize value will be used hereinafter). For example, if it is defined that the addFragSize value is indicated by 4 bits, 16 selectable minimum values ranging from 64 bytes to 1024 bytes are supported for the last fragment.

It should be noted that extending the addFragSize value overcomes the limitation that only 64 bytes, 128 bytes, 192 bytes, and 256 bytes are supported in LLDP AEC, thereby achieving a more accurate representation of allowed fragment sizes.

In an example, the multi-level frame preemption capability means that after a high-priority packet preempts a transmission opportunity of a low-priority packet, the transmission opportunity of the high-priority packet may also be preempted by a higher-priority packet during transmission. If preemption by a high-priority packet is not allowed, one-level frame preemption is supported by default. Whether the port supports the multi-level frame preemption capability depends on the specific implementation of the frame preemption module. According to different implementations of the module, multi-level frame preemption such as two-level, three-level, and four-level frame preemption may be supported.

At step 402, the enhanced frame preemption capability information is sent to a communication peer end.

In an implementation, the extended frame preemption capability information may be advertised to the communication peer end through an AEC data field of an extended LLDP packet. Because bits 0-4 in the AEC data field have been used in the standard, 11 bits, i.e., bits 5-15, may be used to carry the enhanced frame preemption capability information. For example, two bits may be allocated to indicate the reason for frame preemption being not enabled. When the value of bit 1 is 1, indicating that currently the frame preemption module is enabled, values of the two bits are ignored. Four bits are allocated to carry information of the extended addFragSize value, and two bits are used to carry multi-level frame preemption capability information supported. It should be noted that the allocation of the bits to carry the enhanced frame preemption capability information is merely an example, and the specific definitions of the bits are not limited in the embodiments of the present disclosure.

To make the method for advertising enhanced frame preemption capability information in the embodiments of the present disclosure clear, this embodiment provides a method for realizing the advertisement of the extended frame preemption capability information, i.e., the enhanced frame preemption capability information, through an AEC TLV data field of the LLDP packet. In the AEC data field of the LLDP packet, the enhanced frame preemption capability information may be carried in a reserved field such as bits 5-15, such that all the frame preemption capability information can be advertised to the peer end through a single LLDP AEC TLV. The enhanced frame preemption capability information is as shown in FIG. 5. Details are given as follows.

Bits 5-6 are used to indicate the reason for frame preemption being not enabled, where 00 indicates configuration disabled, 01 indicates state machine exception, 10 indicates an unknown reason, and 11 is a reserved value. When the value of bit 1 in the packet received by the peer end is 1, indicating that the port has been enabled, the value of the two bits, i.e., bits 5-6, is ignored.

Bits 7-10 are used to indicate the extended addFragSize parameter. When the value of the four bits is greater than or equal to 0100, the peer end uses the extended addFragSize value for parsing; otherwise, the peer end uses the original addFrageSize value, and the value of the four bits is ignored.

Bits 11-12 are used to indicate the number of levels of multi-level frame preemption supported, where 00 indicates supporting one-level frame preemption (default), 01 indicates supporting two-level frame preemption, 10 indicates supporting three-level frame preemption, and 11 indicates supporting four-level frame preemption.

Bits 13-15 are still a reserved field. It should be noted that the allocation of bits and the meanings of the values of the bits described above are merely examples and are not intended to limit the present disclosure.

In another example, the enhanced frame preemption information may alternatively be encoded in a TLV format and advertised to the communication peer end through carrying in a DATA field of a Verify or Respond packet or through carrying in other protocol packets. The DATA field of the Verify (i.e., SMD_V) or Respond (i.e., SMD_R) packet occupies 60 bytes and can be used to carry the enhanced frame preemption capability information. An SMD field of the SMD_V packet or the SMD_R packet carrying the enhanced frame preemption capability information may be set to a value representing that the enhanced frame preemption capability information is carried. For example, the SMD field is set to a value of 0x0 which currently has not been used. The specific values of Type, Length, and Value of the enhanced frame preemption capability information TLV are not limited in the embodiments of the present disclosure, and may be implemented as private values agreed on by two sides of communication or may be specified by a standards organization in the future. A specific example is described below.

First, the enhanced frame preemption capability information is encoded in a TLV format. It is assumed that the Type and Length fields of TLV each occupy one octet. The encoding of each enhanced frame preemption capability is as follows:

Type=1, Length=2, and the Value field occupies two octets, indicating the reason for not enabled, where Value=0 indicates configuration disabled, Value=1 indicates state machine exception, Value=2 indicates an unknown reason, and other values of Value are reserved values;

Type=2, Length=2, and the Value field occupies two octets, indicating the enhanced addFragSize parameter, where when the value of Value is greater than or equal to 16, it is a reserved value; and Type=3, Length=2, and the Value field occupies two octets, indicating the number of levels of multi-level frame preemption supported, where Value=0 indicates that a system default value is used, Value=1 indicates supporting one-level frame preemption, Value=2 indicates supporting two-level frame preemption, and so on, and when the value of Value is greater than 4, it is a reserved value and an invalid value.

An encapsulation format of the enhanced frame preemption capability information TLV carried in the DATA field of the Verify or Respond packet is shown in FIG. 6.

In addition to the above two manners of carrying the enhanced frame preemption capability information, a value of an SMD field of an mPacket may also be set to a value representing the enhanced frame preemption capability information. For example, SMD=0x80 indicates that the port supports a two-level frame preemption capability, SMD=0x81 indicates that the port supports a three-level frame preemption capability, and SMD=0x90 indicates that the addFragSize value configured at the port is 5. It should be noted that the values of the SMD fields described above are merely examples and are not intended to limit the present disclosure.

In an example, after receiving an SMD_V packet sent by the communication peer end for requesting frame preemption capability information, the local port detects whether it supports preemption, and if yes, performing extension according to the above contents and triggers sending of an SMD_R packet in the case of frame preemption being not enabled or being enabled already.

In other words, when the local port receives the SMD_V packet sent by the communication peer end, the local port can be triggered to send the SMD_R packet to the communication peer end even if the local port supports preemption but preemption is not enabled at the local port. This avoids the problem that the local port cannot quickly inform the peer end and has to wait for the peer end to time out when the local port does not support preemption, thereby solving the delay in the time at which the packet starts to be sent and the consequent problem of buffer waste, and improving the operating efficiency of the local port.

In the embodiments of the present disclosure, the enhanced frame preemption capability information, such as whether frame preemption is supported, whether frame preemption is enabled, frame preemption status, and other specific information, is advertised to the communication peer end. When frame preemption is not enabled at the local port, the local port can advertise this information and provide a detailed reason to the port at the peer end. In addition, more addFragSize options are supported, and the advertisement of a multi-level frame preemption capability is additionally supported. In this way, each of the two sides of communication can better know the current frame preemption capability of the port of the other side, and the reasonable setting of the frame preemption function is ensured, thereby facilitating the port to subsequently perform a frame preemption operation conforming to the frame preemption capabilities of the two sides of communication.

An embodiment of the present disclosure further relates to a method for configuring a frame preemption function, including: receiving enhanced frame preemption capability information sent by a communication peer end, where the enhanced frame preemption capability information includes one or any combination of: a reason for frame preemption being not enabled, an indication value for specifying a minimum value of a last fragment of a preempted packet, or a multi-level frame preemption capability supported by a port; and a number of selectable values supported by the indication value is greater than a preset threshold; and determining a configuration parameter of the frame preemption function according to the enhanced frame preemption capability information sent by the communication peer end and enhanced frame preemption capability information supported locally. In this embodiment, after acquiring the frame preemption capability information of the port at the peer end, the local port configures appropriate parameters for the frame preemption function according to the frame preemption capabilities of the two sides of communication.

Figure 7:
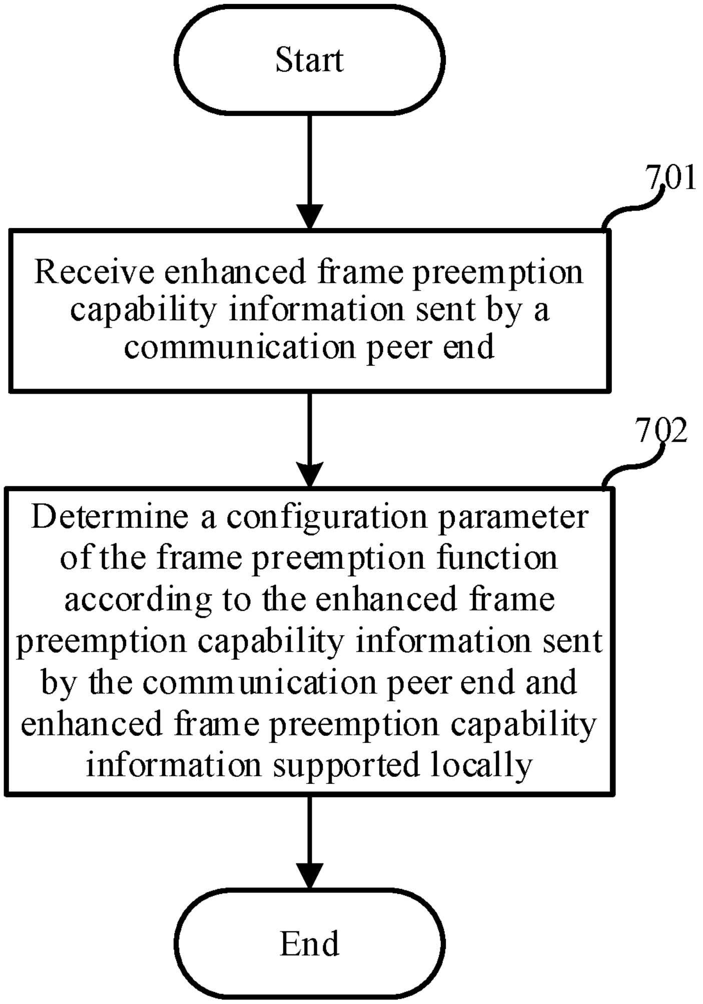
FIG. 7 is a flowchart of a method for configuring a frame preemption function according to an embodiment of the present disclosure.

Implementation details of the method for configuring a frame preemption function in this embodiment will be described below and the following contents are provided only for convenience of understanding the implementation details of the present scheme and are not necessary for implementing the present scheme. As shown in FIG. 7, a detailed process of the method may include the following steps 701 and 702.

At step 701, enhanced frame preemption capability information sent by a communication peer end is received. The enhanced frame preemption capability information includes one or any combination of: a reason for frame preemption being not enabled, an indication value for specifying a minimum value of a last fragment of a preempted packet, or a multi-level frame preemption capability supported by a port. A number of selectable values supported by the indication value is greater than a preset threshold.

At step 702, a configuration parameter of the frame preemption function is determined according to the enhanced frame preemption capability information sent by the communication peer end and enhanced frame preemption capability information supported locally.

In an implementation, the enhanced frame preemption capability information sent by the communication peer end may be received through an LLDP AEC field sent by the peer end. The enhanced frame preemption capability information sent by the communication peer end may alternatively be received through a data field of a Verify (SMD_V) packet or a Respond (SMD_R) packet sent by the communication peer end, where an SMD field of the SMD_V packet or the SMD_R packet carrying the enhanced frame preemption capability information is set to a value representing that the enhanced frame preemption capability information is carried; or received through an SMD field of an mPacket sent by the communication peer end.

In an example, the local port receives the LLDP AEC field from the peer end. Because bits 0-4 in the AEC data field have been used in the standard, 11 bits, i.e., bits 5-15, may be used to carry the enhanced frame preemption capability information. For example, two bits may be allocated to indicate the reason for frame preemption being not enabled. When the value of bit 1 is 1, indicating that currently the frame preemption module is enabled, values of the two bits are ignored. Four bits are allocated to carry information of the extended addFragSize value, and two bits are used to carry multi-level frame preemption capability information supported. It should be noted that the allocation of the bits to carry the enhanced frame preemption capability information is merely an example, and the specific definitions of the bits are not limited in the present disclosure.

In an example, the local port receives the Verify (SMD_V) packet or the Respond (SMD_R) packet from the peer end. A DATA field of the packet occupies 60 bytes and carries the enhanced frame preemption capability information. The specific values of Type, Length, and Value of the enhanced frame preemption capability information TLV are not limited in the embodiments of the present disclosure, and may be implemented as private values agreed on by two sides of communication or may be specified by a standards organization in the future.

In an example, the local port receives the mPacket from the peer end, where a value of the SMD field of the packet is a value representing the enhanced frame preemption capability information. For example, SMD=0x80 indicates that the port supports a two-level frame preemption capability, SMD=0x81 indicates that the port supports a three-level frame preemption capability, and SMD=0x90 indicates that the addFragSize value configured at the port is 5. When the local port receives the mPacket containing these SMD values, the local port can parse a physical layer packet header to obtain an enhanced frame preemption capability of the communication peer end.

To make the method for configuring a frame preemption function in the embodiments of the present disclosure clear, this embodiment will describe in detail how to select a frame preemption capability and configuration enabled by the local port when the local port receives the frame preemption capability information advertised by the communication peer end.

Figure 8:
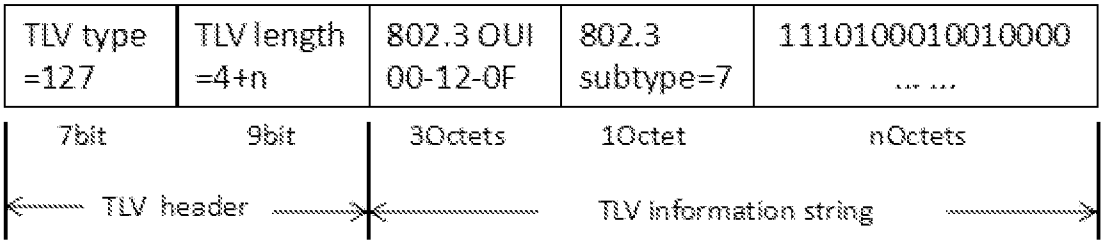
FIG. 8 is a schematic diagram of an extended LLDP AEC field TLV according to an embodiment of the present disclosure.

It is assumed that the local port supports the frame preemption function and the frame preemption function has been enabled, the addFragSize parameter is configured to 1, and the supported multi-level frame preemption capability is three-level frame preemption. The local port receives an LLDP AEC packet advertised by the communication peer end, where type=127 and sub-type=7. An encoding mode of a data field in the LLDP AEC packet is as shown in FIG. 5. The value of the AEC data field is: 111010001001 0000 . . . , as shown in FIG. 8.

The local port parses the received LLDP packet and learns from type=127 and sub-type=7 in TLV that the packet carries information advertising a frame preemption capability. The first two bytes of the data field are parsed. The values of bits 0, 1, and 2 are 1, indicating that the peer end supports and has enabled the frame preemption capability, so bits 5 and 6 are ignored. The value of bits 7 to 10 is 0100, indicating that the minimum value of the last fragment is 316 bytes. Bits 3 and 4 are ignored. The value of bits 11 and 12 is 10, indicating that the peer end supports a two-level frame preemption recovery capability. The values of bits 13 and 15 are ignored.

A frame preemption capability finally set by the local port according to the frame preemption information advertised by the peer end and a locally supported frame preemption capability is: frame preemption is supported and enabled, the addFragSize value is configured to 4, and two-level frame preemption is enabled.

In the embodiments of the present disclosure, a frame preemption parameter conforming to the frame preemption capabilities of the two sides of communication is finally configured according to the enhanced frame preemption capability information sent by the peer end and the locally supported frame preemption capability. In this way, the two sides of communication can properly use the packet transmission preemption function during the packet transmission process, thereby improving the operating efficiency of packet transmission.

It should be understood that the division of the steps of the above methods is only for the sake of clear description, and in practical applications, the steps may be combined into one step, or some steps may be divided into multiple steps. Such combination or division falls within the scope of protection of the present disclosure as long as the same logical relationship is included. Any insignificant modification made to or any insignificant design introduced in an algorithm or process without changing the core design of the algorithm and process shall fall within the scope of protection of the present disclosure.

Figure 9:
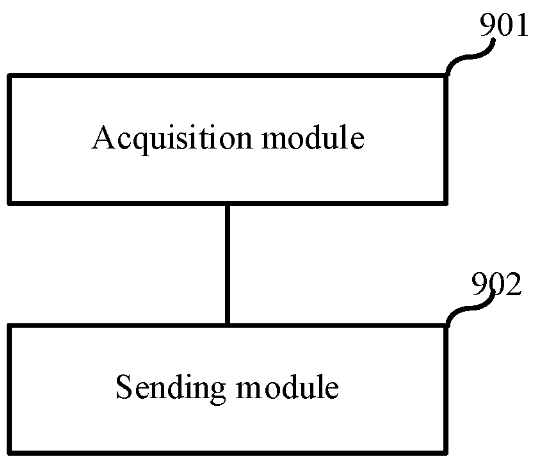
FIG. 9 is a schematic structural diagram of an apparatus for advertising enhanced frame preemption capability information according to an embodiment of the present disclosure.

An embodiment of the present disclosure further provides an apparatus for advertising enhanced frame preemption capability information. As shown in FIG. 9, the apparatus for advertising enhanced frame preemption capability information includes an acquisition module 901 and a sending module 902.

In an implementation, the acquisition module 901 is configured for acquiring enhanced frame preemption capability information. The enhanced frame preemption capability information includes one or any combination of: a reason for frame preemption being not enabled, an indication value for specifying a minimum value of a last fragment of a preempted packet, or a multi-level frame preemption capability supported by a port. A number of selectable values supported by the indication value is greater than a preset threshold. The sending module 902 is configured for sending the enhanced frame preemption capability information to a communication peer end.

In an example, the reason for frame preemption being not enabled that is acquired by the acquisition module 901 includes: management configuration being disabled, state machine exception, unsuccessful state machine initialization, and an unknown reason.

In an example, the addFragSize value retrieved by the acquisition module 901 may support 16 selectable minimum values ranging from 64 bytes to 1024 bytes for the last fragment.

In an example, the multi-level frame preemption capability information acquired by the acquisition module 901 means that after a high-priority packet preempts a transmission opportunity of a low-priority packet, the transmission opportunity of the high-priority packet may also be preempted by a higher-priority packet during transmission. If preemption by a high-priority packet is not allowed, one-level frame preemption is supported by default. Whether the port supports the multi-level frame preemption capability depends on the specific implementation of the frame preemption module. According to different implementations of the module, multi-level frame preemption such as two-level, three-level, and four-level frame preemption may be supported.

In an example, the sending module 902 may advertise the extended frame preemption capability information to the communication peer end through an AEC data field of an extended LLDP packet; or may encode the enhanced frame preemption information in a TLV format and advertise the encoded enhanced frame preemption information to the communication peer end through carrying in a DATA field of a Verify or Respond packet or through carrying in other protocol packets; or may advertise the enhanced frame preemption capability information to the communication peer end by setting a value of an SMD field of an mPacket to a value representing the enhanced frame preemption capability information.

In an example, after receiving an SMD_V packet sent by the communication peer end for requesting frame preemption capability information, the local port detects whether it supports preemption, and if yes, performs extension according to the above contents and triggers sending of an SMD_R packet in the case of frame preemption being not enabled or being enabled already.

According to the apparatus for advertising enhanced frame preemption capability information in the embodiments of the present disclosure, the enhanced frame preemption capability information, such as whether frame preemption is supported, whether frame preemption is enabled, frame preemption status, and other specific information, is advertised to the communication peer end. When frame preemption is not enabled at the local port, the local port can advertise this information and provide a detailed reason to the port at the peer end. In addition, more addFragSize options are supported, and the advertisement of a multi-level frame preemption capability is additionally supported. In this way, each of the two sides of communication can better know the current frame preemption capability of the port of the other side, and the reasonable setting of the frame preemption function is ensured, thereby facilitating the port to subsequently perform a frame preemption operation conforming to the frame preemption capabilities of the two sides of communication.

It can be seen that this embodiment is an apparatus embodiment corresponding to the foregoing embodiment of the method for advertising enhanced frame preemption capability information, and this embodiment may be implemented in combination with the foregoing embodiment of the method for advertising enhanced frame preemption capability information. The related technical details mentioned in the foregoing embodiment of the method for advertising enhanced frame preemption capability information are still valid in this embodiment, and the details will not be repeated herein in order to reduce repetition. Correspondingly, the related technical details mentioned in this embodiment are also applicable to the foregoing embodiment of the method for advertising enhanced frame preemption capability information.

Figure 10:
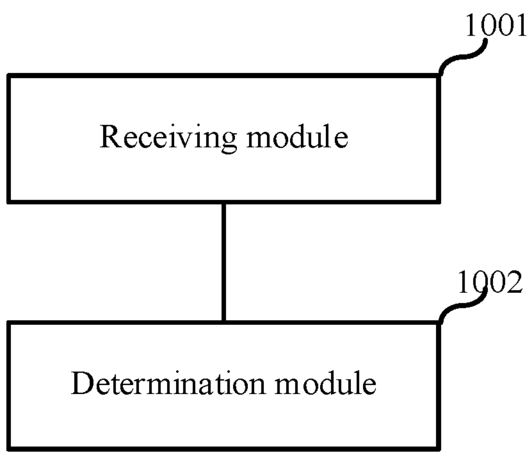
FIG. 10 is a schematic structural diagram of an apparatus for configuring a frame preemption function according to an embodiment of the present disclosure.

An embodiment of the present disclosure further provides an apparatus for configuring a frame preemption function. As shown in FIG. 10, the apparatus for configuring a frame preemption function includes a receiving module 1001 and a determination module 1002.

In an implementation, the receiving module 1001 is configured for receiving enhanced frame preemption capability information sent by a communication peer end. The enhanced frame preemption capability information includes one or any combination of: a reason for frame preemption being not enabled, an indication value for specifying a minimum value of a last fragment of a preempted packet, or a multi-level frame preemption capability supported by a port. A number of selectable values supported by the indication value is greater than a preset threshold. The determination module 1002 is configured for determining a configuration parameter of the frame preemption function according to the enhanced frame preemption capability information sent by the communication peer end and enhanced frame preemption capability information supported locally.

In an example, the receiving module 1001 receives an LLDP AEC field from the peer end. As can be seen from the Background section, bits 0-4 in the AEC data field are basic frame preemption capability information. 11 bits, i.e., bits 5-15, may be used to carry the enhanced frame preemption capability information. For example, two bits may be allocated to indicate the reason for frame preemption being not enabled. When the value of bit 1 is 1, indicating that currently the frame preemption module is enabled, values of the two bits are ignored. Four bits are allocated to carry information of the extended addFragSize value, and two bits are used to carry multi-level frame preemption capability information supported. It should be noted that the allocation of the bits to carry the enhanced frame preemption capability information is merely an example, and the specific definitions of the bits are not limited in the embodiments of the present disclosure.

In an example, the receiving module 1001 receives a Verify (SMD_V) packet or a Respond (SMD_R) packet from the peer end. A DATA field of the packet occupies 60 bytes and carries the enhanced frame preemption capability information. The specific values of Type, Length, and Value of the enhanced frame preemption capability information TLV are not limited in the embodiments of the present disclosure, and may be implemented as private values agreed on by two sides of communication or may be specified by a standards organization in the future.

In an example, the receiving module 1001 receives an mPacket from the peer end, where a value of an SMD field of the packet is a value representing the enhanced frame preemption capability information. For example, SMD=0x80 indicates that the port supports a two-level frame preemption capability, SMD=0x81 indicates that the port supports a three-level frame preemption capability, and SMD=0x90 indicates that the addFragSize value configured at the port is 5. When the receiving module 1001 receives the mPacket containing these SMD values, the receiving module 1001 can parse a physical layer packet header to obtain an enhanced frame preemption capability of the communication peer end.

In an example, the determination module 1002 finally configures a frame preemption parameter conforming to the frame preemption capabilities of the two sides of communication according to the frame preemption information advertised by the peer end and the locally supported frame preemption capability.

According to the apparatus for configuring a frame preemption function in the embodiments of the present disclosure, a frame preemption parameter conforming to the frame preemption capabilities of the two sides of communication is finally configured according to the enhanced frame preemption capability information sent by the peer end and the locally supported frame preemption capability. In this way, the two sides of communication can properly use the packet transmission preemption function during the packet transmission process, thereby improving the operating efficiency of packet transmission.

It can be seen that this embodiment is an apparatus embodiment corresponding to the foregoing embodiment of the method for configuring a frame preemption function, and this embodiment may be implemented in combination with the foregoing embodiment of the method for configuring a frame preemption function. The related technical details mentioned in the foregoing embodiment of the method for configuring a frame preemption function are still valid in this embodiment, and the details will not be repeated herein in order to reduce repetition. Correspondingly, the related technical details mentioned in this embodiment is also applicable to the foregoing embodiment of the method for configuring a frame preemption function.

It is to be noted that each module involved in the above embodiments of the present disclosure is a logic module. In practical applications, a logic unit may be a physical unit or a part of a physical unit, or may be implemented by a combination of a plurality of physical units. In addition, in order to highlight the innovative part of the present disclosure, units that are not closely related to the technical problem to be solved in the present disclosure are not introduced in this embodiment, but this does not mean that there are no other units in this embodiment.

Figure 11:
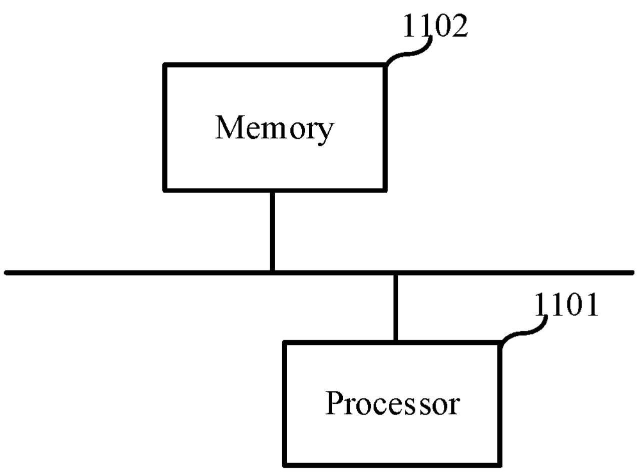
FIG. 11 is a schematic structural diagram of a communication device according to an embodiment of the present disclosure.

An embodiment of the present disclosure further provides a communication device. As shown in FIG. 11, the communication device includes at least one processor 1101 and a memory 1102 communicatively connected to the at least one processor 1101. The memory 1102 stores an instruction executable by the at least one processor which, when executed by the at least one processor 1101, causes the at least one processor 1101 to implement the method for advertising enhanced frame preemption capability information or the method for configuring a frame preemption function.

The memory and the processor are connected by a bus. The bus may include any number of interconnected buses and bridges. The bus connects various circuits of one or more processors and the memory together. The bus may also connect together a peripheral device, a voltage regulator, a power management circuit, and other circuits, which are all well known in the art and therefore will not be detailed herein. A bus interface provides an interface between the bus and a transceiver. The transceiver may be one element or a plurality of elements, for example, a plurality of receivers and transmitters, and provides a unit for communicating with various other apparatus over a transmission medium. Data processed by the processor is transmitted over a wireless medium through an antenna. The antenna receives data and transmits the data to the processor.

The processor is responsible for managing the bus and general processing and may also provide various functions including timing, peripheral interfaces, voltage regulation, power management and other control functions. The memory may be configured to store data used by the processor in performing operations.

The product can execute the methods provided in the embodiments of the present disclosure, and has functional modules and beneficial effects corresponding to the methods executed. For technical details that are not described in detail in this embodiment, reference can be made to the methods provided in the embodiments of the present disclosure.

An embodiment of the present disclosure further provides a computer-readable storage medium, storing a computer program which, when executed by a processor, causes the processor to implement the foregoing method embodiments.

In the embodiments of the present disclosure, the enhanced frame preemption capability information, such as the reason for frame preemption being not enabled, the indication value for specifying the minimum value of the last fragment of the preempted packet, or the multi-level frame preemption capability supported by the local port, is advertised to the communication peer end. In this way, when frame preemption is not enabled at the local port, the local port can advertise this information and provide a detailed reason to the port of the peer end. In addition, more addFragSize options are supported, and the advertisement of a multi-level frame preemption capability is additionally supported, thereby ensuring the reasonable setting of the frame preemption function.

It may be understood by those having ordinary skills in the art that all or some of the steps of the methods in the above embodiments may be performed by a program instructing related hardware. The program is stored in a storage medium, and includes several instructions to cause a device (which may be a single chip microcomputer, a chip, etc.) or a processor to perform all or some of the steps of the methods described in the embodiments of the present disclosure. The foregoing storage medium includes: any medium that can store program code, such as a Universal Serial Bus (USB) flash drive, a removable hard disk, a Read-Only Memory (ROM), a Random Access Memory (RAM), a magnetic disk, or an optical disk.

The above embodiments are provided for those having ordinary skills in the art to implement and use the present disclosure, and those having ordinary skills in the art can make various modifications or changes to the above embodiments without departing from the inventive idea of the present disclosure. Therefore, the scope of protection of the present disclosure is not limited by the above embodiments, but should conform to the maximum scope of the innovative features mentioned in the claims.

What is claimed is:

1. A method for advertising enhanced frame preemption capability information, comprising:

acquiring, by a local port, enhanced frame preemption capability information, wherein the enhanced frame preemption capability information comprises at least one of:

a reason for frame preemption being not enabled, wherein the reason for frame preemption being not enabled comprises: management configuration being disabled, state machine exception, unsuccessful state machine initialization; or an indication value for specifying a minimum value of a last fragment of a preempted packet, wherein, a number of selectable values supported by the indication value is greater than a preset threshold;

and sending, by the local port, the enhanced frame preemption capability information to a communication peer end.

2. The method for advertising enhanced frame preemption capability information of claim 1, wherein sending the enhanced frame preemption capability information to a communication peer end comprises:

sending the enhanced frame preemption capability information to the communication peer end by extending an Additional Ethernet Capabilities (AEC) field of a Link Layer Discovery Protocol (LLDP) packet.

3. The method for advertising enhanced frame preemption capability information of claim 1, wherein sending the enhanced frame preemption capability information to a communication peer end comprises:

encoding the enhanced frame preemption capability information in a Tag-Length-Value (TLV) format, adding the encoded enhanced frame preemption capability information to a data field of a verify (SMD_V) packet or a respond (SMD_R) packet, and sending the SMD_V packet or the SMD_R packet to the communication peer end, wherein a Start mPacket Delimiter (SMD) field of the SMD_V packet or the SMD_R packet carrying the enhanced frame preemption capability information is set to a value representing that the enhanced frame preemption capability information is carried.

4. The method for advertising enhanced frame preemption capability information of claim 1, wherein sending the enhanced frame preemption capability information to a communication peer end comprises:

setting a value of a SMD field of a Media Access Control (MAC) Merge Packet (mPacket) to a value representing the enhanced frame preemption capability information.

5. The method for advertising enhanced frame preemption capability information of claim 1, wherein the method further comprises:

triggering sending of an SMD_R packet in response to frame preemption being not enabled or being enabled already, after receiving an SMD_V packet sent by the communication peer end for requesting frame preemption capability information.

6. A communication device, comprising:

at least one processor; and a memory communicatively connected to the at least one processor, wherein:

the memory stores an instruction executable by the at least one processor which, when executed by the at least one processor, causes the at least one processor to carry out the method for advertising enhanced frame preemption capability information of claim 1.

7. A non-transitory computer-readable storage medium, storing a computer program which, when executed by a processor, causes the processor to carry out the method for advertising enhanced frame preemption capability information of claim 1.

8. The method for advertising enhanced frame preemption capability information of claim 2, wherein the method further comprises:

triggering sending of an SMD_R packet in response to frame preemption being not enabled or being enabled already, after receiving an SMD_V packet sent by the communication peer end for requesting frame preemption capability information.

9. The method for advertising enhanced frame preemption capability information of claim 3, wherein the method further comprises:

triggering sending of an SMD_R packet in response to frame preemption being not enabled or being enabled already, after receiving an SMD_V packet sent by the communication peer end for requesting frame preemption capability information.

10. The method for advertising enhanced frame preemption capability information of claim 4, wherein the method further comprises:

triggering sending of an SMD_R packet in response to frame preemption being not enabled or being enabled already, after receiving an SMD_V packet sent by the communication peer end for requesting frame preemption capability information.

11. A method for configuring a frame preemption function, comprising:

receiving, by a local port, enhanced frame preemption capability information sent by a communication peer end, wherein the enhanced frame preemption capability information comprises at least one of:

a reason for frame preemption being not enabled, wherein the reason for frame preemption being not enabled comprises: management configuration being disabled, state machine exception, unsuccessful state machine initialization; or an indication value for specifying a minimum value of a last fragment of a preempted packet, wherein, a number of selectable values supported by the indication value is greater than a preset threshold; and determining, by the local port, a configuration parameter of the frame preemption function according to the enhanced frame preemption capability information sent by the communication peer end and enhanced frame preemption capability information supported locally.

12. The method for configuring a frame preemption function of claim 11, wherein receiving enhanced frame preemption capability information sent by a communication peer end comprises:

receiving the enhanced frame preemption capability information through an extended Additional Ethernet Capabilities (AEC) field of a Link Layer Discovery Protocol (LLDP) packet sent by the communication peer end; or receiving the enhanced frame preemption capability information through a data field of a Verify (SMD_V) packet or a Respond (SMD_R) packet sent by the communication peer end, wherein a Start mPacket Delimiter (SMD) field of the SMD_V packet or the SMD_R packet carrying the enhanced frame preemption capability information is set to a value representing that the enhanced frame preemption capability information is carried; or receiving the enhanced frame preemption capability information through a SMD field of a Media Access Control (MAC) Merge Packet (mPacket) sent by the communication peer end.

13. A communication device, comprising:

at least one processor; and a memory communicatively connected to the at least one processor, wherein:

the memory stores an instruction executable by the at least one processor which, when executed by the at least one processor, causes the at least one processor to carry out the method for configuring a frame preemption function of claim 11.

14. A non-transitory computer-readable storage medium, storing a computer program which, when executed by a processor, causes the processor to carry out the method for configuring a frame preemption function of claim 11.

* * * * *